United States Patent
Oliverio

(10) Patent No.: US 9,938,906 B2
(45) Date of Patent: Apr. 10, 2018

(54) COMBUSTION STABILITY LOGIC DURING OFF-LOAD TRANSIENTS

(71) Applicant: Solar Turbines Incorporated, San Diego, CA (US)

(72) Inventor: Fabrizio Oliverio, Moltrasio (IT)

(73) Assignee: Solar Turbines Incorporated, San Diego, CA (US)

( * ) Notice: Subject to any disclaimer, the term of this patent is extended or adjusted under 35 U.S.C. 154(b) by 365 days.

(21) Appl. No.: 14/727,019

(22) Filed: Jun. 1, 2015

(65) Prior Publication Data

US 2016/0348593 A1 Dec. 1, 2016

(51) Int. Cl.
*F02C 9/00* (2006.01)
*F02C 9/28* (2006.01)
*F02C 9/54* (2006.01)

(52) U.S. Cl.
CPC .............. *F02C 9/28* (2013.01); *F02C 9/54* (2013.01); *F05D 2270/303* (2013.01); *F05D 2270/304* (2013.01); *F05D 2270/31* (2013.01)

(58) Field of Classification Search
CPC ........ F02C 9/28; F02C 9/54; F05D 2270/303; F05D 2270/304; F05D 2270/31
See application file for complete search history.

(56) References Cited

U.S. PATENT DOCUMENTS

| | | | |
|---|---|---|---|
| 4,864,813 A | 9/1989 | Krukoski | |
| 4,947,643 A * | 8/1990 | Pollak | F02C 9/28 60/236 |
| 5,133,182 A * | 7/1992 | Marcos | F02C 9/28 60/39.27 |
| 5,261,222 A * | 11/1993 | Napoli | F02C 7/228 60/778 |
| 5,321,947 A * | 6/1994 | Sood | F23R 3/346 60/737 |
| 5,372,008 A * | 12/1994 | Sood | F23C 1/00 431/352 |
| 5,896,736 A * | 4/1999 | Rajamani | F02C 9/20 60/773 |
| 6,381,947 B2 * | 5/2002 | Emmons | F23C 15/00 137/625.17 |
| 6,779,346 B2 | 8/2004 | Nichols et al. | |
| 6,820,429 B2 | 11/2004 | Meisner | |
| 7,822,512 B2 | 10/2010 | Thatcher et al. | |
| 8,578,717 B2 * | 11/2013 | Tonno | F02C 9/46 60/39.1 |
| 8,739,551 B2 | 6/2014 | Grewe et al. | |
| 2002/0158517 A1 | 10/2002 | Rouse et al. | |
| 2014/0165583 A1 | 6/2014 | Oliverio | |

* cited by examiner

*Primary Examiner* — Jesse Bogue
(74) *Attorney, Agent, or Firm* — Procopio, Cory, Hargreaves & Savitch LLP; James R. Smith

(57) ABSTRACT

A method for operating a gas turbine engine is disclosed. The method includes detecting an off-load transient of the gas turbine engine. The method includes reducing a total flow of fuel to a combustor section of the gas turbine engine to a first reduced flow in response to detecting the off-load transient. The method includes adjusting a position of an inlet guide vane in response to detecting the off-load transient until either an on-load transient is detected or until an amount of time elapsed since detection of the off-load transient exceeds a maximum override time.

18 Claims, 4 Drawing Sheets

COMBUSTION STABILITY LOGIC DURING OFF-LOAD TRANSIENTS

TECHNICAL FIELD

The present disclosure generally pertains to a system for controlling inlet guide vanes associated with a gas turbine engine, and more particularly, to a method and apparatus for setting and actuating inlet guide vanes when an off-load transient is detected.

BACKGROUND

Gas turbine engines include compressor, combustor, and turbine sections. The compressor section includes inlet guide vanes. A control system may control the angle of the inlet guide vanes and the inlet flow area of the compressor section. In order to compensate for an off-load transient or reduced load conditions, the control system may adjust the angle of the inlet guide vanes to reduce the amount of compressed air that is delivered into the combustor section.

U.S. Patent App. Pub. No. 2014/0165583 to F. Oliverio discloses a bleed valve override schedule on off-load transients. A method is disclosed for controlling a position of a bleed valve of a gas turbine engine. The onset of an off-load transient may be determined. Values representative of the turbine rotor inlet temperature and the exhaust outlet temperature may be determined. The amount of time elapsed since the onset of the off-load transient may be determined. Three provisional bleed valve command positions may be determined based on value representative of the turbine rotor inlet temperature, the value representative of the exhaust outlet temperature, and the amount of time elapsed, respectively. The provisional bleed valve command position associated with the lowest relative value may be selected. The bleed valve position may be adjusted to match the selected bleed valve command position.

The present disclosure is directed toward overcoming one or more of the problems discovered by the inventor or that is known in the art.

SUMMARY OF THE DISCLOSURE

A method for operating a gas turbine engine is disclosed. The method includes detecting an off-load transient of the gas turbine engine. The method also includes reducing a total flow of fuel to a combustor section of the gas turbine engine to a first reduced flow in response to detecting the off-load transient. The method also includes increasing a ratio of pilot fuel to total fuel in the first reduced flow of fuel in response to detecting the off-load transient. The method also includes adjusting a position of an inlet guide vane in response to detecting the off-load transient until either an on-load transient is detected or until an amount of time elapsed since detection of the off-load transient exceeds a maximum override time.

DETAILED DESCRIPTION

The systems and methods disclosed herein include combustion stability logic for a gas turbine control system of a gas turbine engine during off-load transients. The methods include adjusting the angle of an inlet guide vane of the gas turbine engine in response to various parameters. Some of the various parameters may include time elapsed, rotational speed of certain components of the gas turbine engine, and temperature of certain components of the gas turbine engine. The method may assist in preventing shut down of the gas turbine engine due to flame-out, while preventing over-speed and/or over-temperature conditions during off-load transients.

Figure 1:
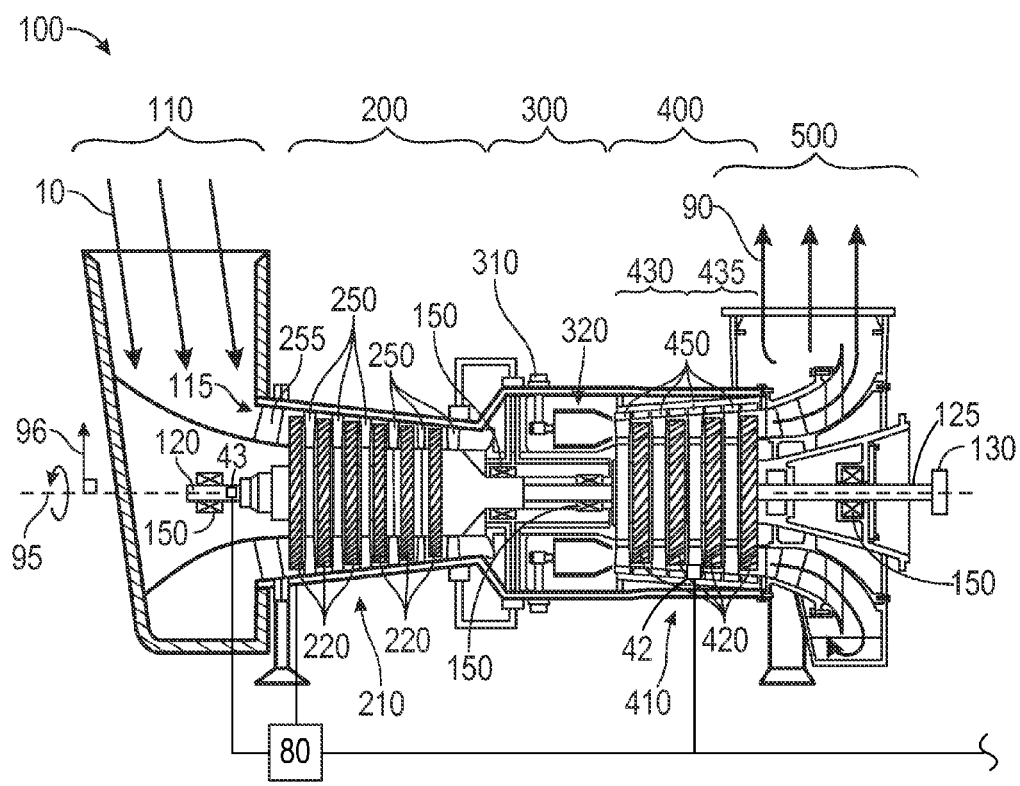
FIG. 1 is a schematic illustration of an exemplary gas turbine engine.

FIG. 1 is a schematic illustration of an exemplary gas turbine engine 100. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from center axis 95, wherein a radial 96 may be in any direction perpendicular and radiating outward from center axis 95.

A gas turbine engine 100 includes an inlet 110, a shaft 120, a compressor 200, a combustor 300, a turbine 400, an exhaust 500, and a power output coupling 130.

The compressor 200 includes a compressor rotor assembly 210, compressor stationary vanes (stators) 250, and inlet guide vanes ("IGV") 255. The compressor rotor assembly 210 mechanically couples to shaft 120. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages.

Inlet guide vanes 255 axially precede the compressor stages. Inlet guide vanes 255 are variable guide vanes. Inlet guide vanes 255 may each be rotated about the axis of the inlet guide vane 255. Along with the inlet guide vanes 255, the first few stages of stators 250 may also be variable guide vanes mechanically linked to the inlet guide vanes. In the embodiment illustrated, compressor 200 includes three stages of stators 250 that include variable guide vanes located axially aft of inlet guide vanes 255, the three stages of stators being the first three stages of compressor 200.

Inlet guide vanes 255 may be rotated to modify or control the inlet flow area of the compressor 200 by an actuation system (not shown). Actuation system may be controlled by a controller 80.

The combustor 300 includes one or more fuel injectors 310 and includes one or more combustion chambers 320. The fuel injectors 310 may be annularly arranged about center axis 95.

The turbine 400 includes a turbine rotor assembly 410 and turbine nozzles 450. The turbine rotor assembly 410 mechanically couples to the shaft 120. As illustrated, the turbine rotor assembly 410 is an axial flow rotor assembly. The turbine rotor assembly 410 includes one or more turbine disk assemblies 420. Each turbine disk assembly 420 includes a turbine disk that is circumferentially populated with turbine blades. Turbine nozzles 450 axially precede each of the turbine disk assemblies 420. Each turbine disk assembly 420 when paired with the adjacent turbine nozzles 450 that precede the turbine disk assembly 420 is considered a turbine stage. Turbine 400 may include multiple turbine stages.

Gas turbine engine 100 may include a single or multiple shaft configuration. In the embodiment illustrated, gas turbine engine 100 is a dual shaft configuration. In some embodiments, gas turbine engine 100 includes shaft 120 and a second shaft. In this embodiment, shaft 120 is a gas producer shaft. In addition to shaft 120, gas turbine engine 100 includes a power turbine shaft 125. The shaft 120 mechanically couples to compressor rotor assembly 210 and to turbine disk assemblies 420 in a gas producer turbine section 430 of turbine section 400. Power turbine shaft 125 couples to turbine disk assemblies 420 in a power turbine section 435 of turbine section 400. Power turbine shaft 125 may also be coupled to power output coupling 130. In single shaft configuration embodiments (not shown), shaft 120 is mechanically coupled to compressor rotor assembly 210, all turbine disk assemblies 420 of turbine section 400, and to power output coupling 130.

Gas turbine engine 100 may further include a number of sensors. These sensors may include a turbine temperature sensor 42 and a shaft speed sensor 43. In some embodiments, turbine temperature sensor 42 is configured to gather data relating to a temperature within turbine section 400. In further embodiments, turbine temperature sensor 42 measures the temperature of the combusted fuel and air mixture after they pass through at least one stage of turbine section 400. In the embodiment shown in FIG. 1, turbine temperature sensor 42 measures the temperature at the power turbine section inlet. In such embodiments, turbine temperature sensor 42 is a power turbine inlet temperature (PTIT) sensor (sometimes referred to as T5). In some embodiments, shaft speed sensor 43 may be located on and coupled to shaft 120. In some embodiments, shaft speed sensor 43 measures the rotational speed of shaft 120.

Controller 80 may be configured to receive sensor measurements and make calculations based upon such sensor measurements, as discussed herein. Specifically, controller 80 may be in communication with turbine temperature sensor 42 and/or shaft speed sensor 43. Further, controller 80 may direct aspects of gas turbine engine operation including the supply of pilot fuel and main fuel, as well as the amount of compressed air passing through compressor section 200. Controller 80 may also monitor for changes in load via sensors (not shown) or other methods known in the art. In conjunction with such monitoring, controller 80 may be further configured so as to determine whether gas turbine engine 100 is in an on-load, an off-load, or reduced load condition, and to detect off-load and on-load transients.

Figure 2:
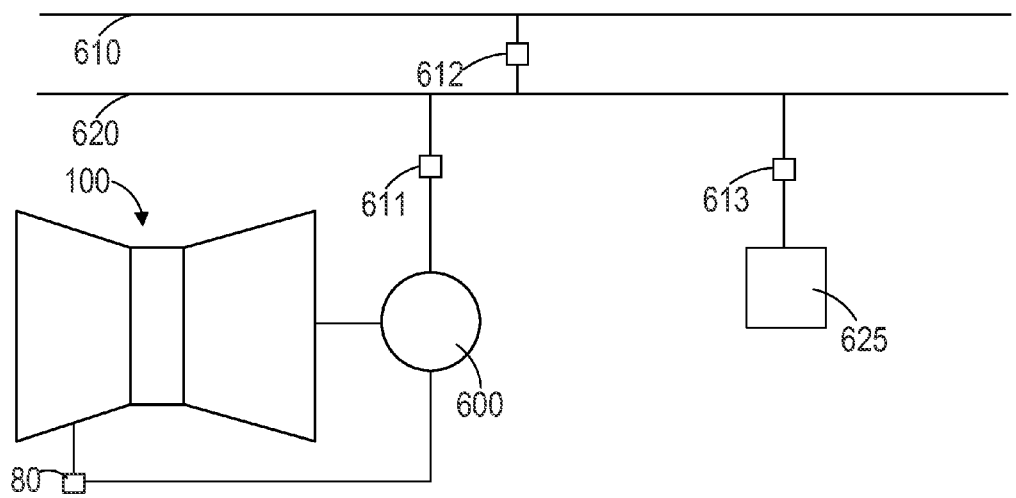
FIG. 2 is a schematic illustration of a gas turbine engine coupled to a generator, a customer plant bus bar, and a utility grid bus bar.

FIG. 2 is a schematic illustration of gas turbine engine 100 coupled to a generator 600, a customer plant bus bar 620, and a utility grid bus bar 610. Generator 600 may be an electrical power generator or other type of machinery that may be coupled to and powered by gas turbine engine 100. In embodiments, gas turbine engine 100 generates mechanical energy to generator 600. Generator 600 may convert the mechanical energy to electrical energy. The electrical energy converted by generator 600 may be supplied to a customer plant (not shown) and a utility grid (not shown) via customer plant bus bar 620 and utility grid bus bar 610, respectively. As shown in the figure, generator 600 may be connected to customer plant bus bar 620 by a generator circuit breaker 611. Utility grid bus bar 610 may be connected to customer plant bus bar 620 by a utility grid circuit breaker 612. Furthermore, customer plant bus bar 620 may be connected to a customer load 625 by a customer plant circuit breaker 613.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

For example, gas turbine engine 100 may be used to drive a generator, and such a generator may generate large amounts (on the order of megawatts) of electrical energy. The energy may be provided to an electrical power grid (also known as a utility grid). A gas turbine engine 100 driving a full (or otherwise substantial) load is considered to be in an "on-load" condition. A gas turbine engine 100 driving no load (or a negligible load) is considered to be in an "off-load" condition. Additionally, a gas turbine engine 100 driving a load substantially less than its full load is considered to be in a reduced load condition. Under certain circumstances, such as, if the utility grid goes offline or if the circuit breaker for the power generator is triggered, the load being driven by the gas turbine engine 100 may drop substantially in a short period of time to an off-load or reduced load condition, for example, as low as 0 to 500 kilowatts. This is known as an off-load transient. If the power output of the gas turbine engine 100 is not reduced commensurate with the drop in load, the gas turbine engine 100 may go into an overspeed state, creating potentially hazardous conditions that may damage the gas turbine engine 100 and its surroundings.

Upon detection of an off-load transient, controller 80 of gas turbine engine 100 may cause a reduction in the total flow of fuel and increase the ratio of pilot fuel to total fuel (hereinafter may be referred to as pilot fuel ratio) to compensate for the reduction of load. For example, controller 80 may command a fuel response to increase the pilot fuel ratio from approximately 2% to approximately 40%. Increasing the pilot fuel ratio and reducing the total flow of fuel may result in a reduced amount of combustion, and a commensurate reduction in heat generation within the combustor section 300. This reduction in heat generation, when combined with the cooling effect of the flow of compressed air from compressor section 200 through combustor section 300, may reduce the temperature in the combustor section 300. This may destabilize the combustion of the fuel provided by the fuel injectors and may result in a "partial flame-out," wherein the flame of one or more fuel injectors is extinguished, or a "total flame-out," wherein all combustion within the combustor section 300 is extinguished.

Embodiments of the present disclosure may be used to improve or maintain gas turbine engine performance upon onset of an off-load transient. An off-load transient may occur, for example, when the utility grid circuit breaker 612 of FIG. 2 is triggered open and the power output of gas turbine engine 100 immediately before the opening of the utility grid circuit breaker 612 is substantially greater than the customer load 625 of FIG. 2. In response to a detection of an off-load transient, the amount of air entering compressor section 200 may be modified by controller 80 according to an inlet guide vane combustion stability process.

The presently disclosed methods and systems may be utilized to facilitate the safe, effective, and continuous operation of a gas turbine engine 100 during off-load transients. Use by controller 80 of the inlet guide vane combustion stability process upon onset of off-load transients may reduce the likelihood of partial or total flame-out, while avoiding an over-temperature condition and/or over-speed condition. For example, reducing air flow into the compressor section 200 in response to a detection of an off-load transient reduces the flow of compressed air through the combustor section 300, thereby limiting the decrease in temperature that typically occurs when a gas turbine engine 100 alters the fuel supply in response to an off-load transient. This relative increase in temperature (e.g., as compared to the temperature in combustor section 300 when total fuel flow is reduced without reducing air flow into the compressor section 200) stabilizes combustion and greatly reduces the risk of flame-out. On the other hand, an excessive or prolonged reduction in the amount of compressed air flow might lead to an over-temperature state in the gas turbine engine 100 or to an over-speed state of the shaft 120, which could present potentially hazardous conditions that may damage the gas turbine engine 100 and its surroundings. The embodiments of the present disclosure may serve to prevent flame-out while avoiding over-temperature and/or over-speed conditions.

Figure 6:
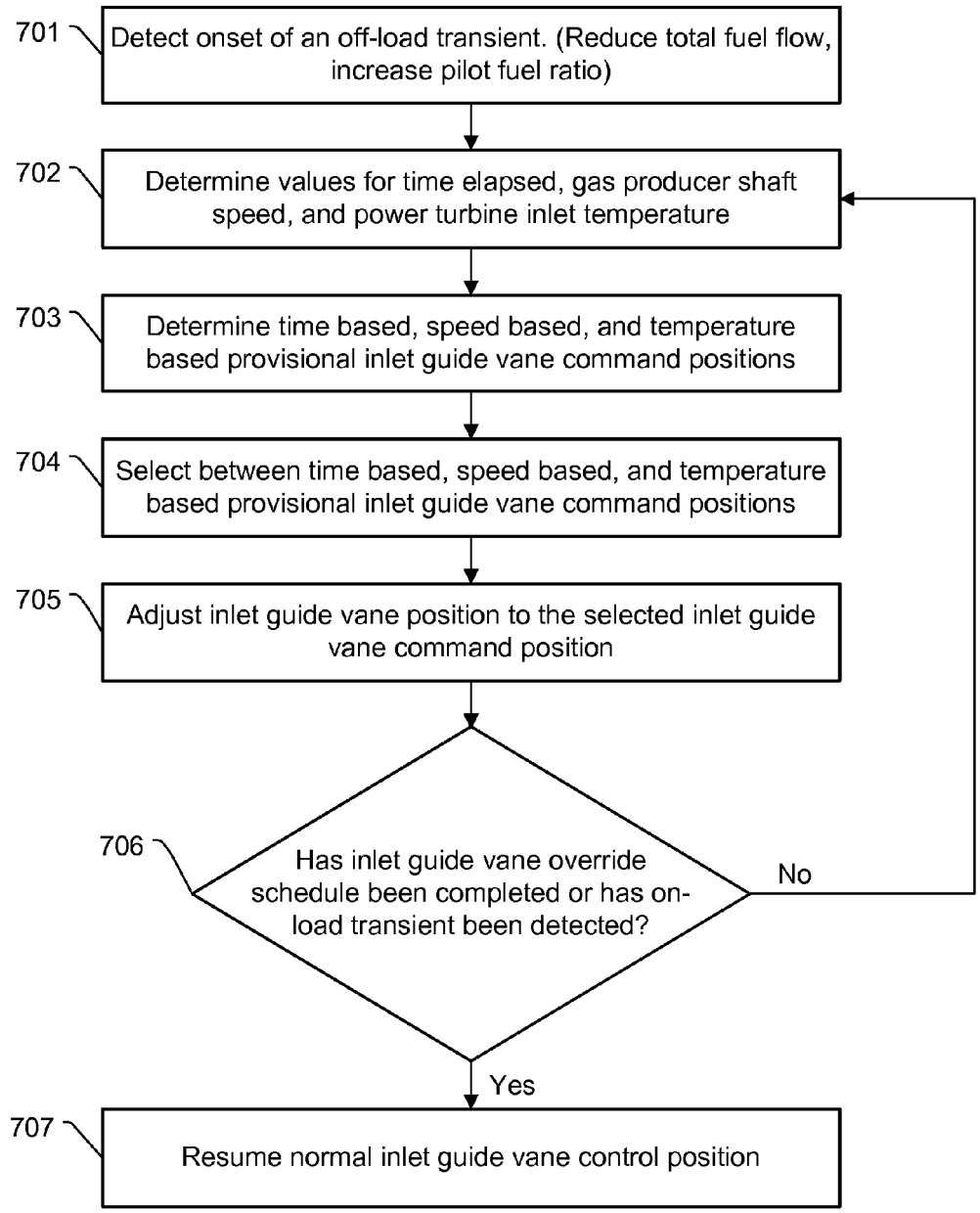
FIG. 6 is a flow chart illustrating an exemplary method of stabilizing the combustion of a gas turbine engine during an off-load transient.

FIG. 6 is a flow chart illustrating an exemplary method of stabilizing the combustion of gas turbine engine 100 during an off-load transient. Such a method may assist in preventing flame-out of the gas turbine engine, while at the same time avoiding engine over-temperature and/or engine over-speed conditions.

At a step 701, controller 80 may detect the onset of an off-load transient by monitoring the power drain sustained by generator 600. In some embodiments, controller 80 may monitor generator 600 by scanning the power output approximately every 20 milliseconds. The onset of an off-load transient may be found when controller 80 detects a drop in load that is greater than a threshold amount, for example, more than 1000 kW within a specific time frame, such as between power drain scans. Alternatively, the onset of an off-load transient may be found when generator 600 signals to controller 80 that an off-load transient has been detected. Upon detecting an off-load transient, controller 80 may reduce the supply of total fuel, increase the ratio of pilot fuel to total fuel, and initiate an inlet guide vane (IGV) combustion stability process. These sub-steps may occur simultaneously or otherwise within a very small time frame.

At a step 702, controller 80 may determine values for turbine temperature, shaft speed (sometimes referred to as "$N_{GP}$"), and the amount of time elapsed since the onset of the off-load transient (or initiation of IGV combustion stability process). As discussed above in FIG. 1, the turbine temperature and $N_{GP}$ values may be measured directly by turbine temperature sensor 42 and shaft speed sensor 43, respectively, or may be calculated from other related sensor measurements.

At a step 703, in parallel or in sequence, controller 80 may determine the one or more provisional IGV command positions. For example, controller 80 may determine three provisional IGV command positions based upon the amount of time elapsed since the initiation of the IGV combustion stability process, the values for shaft speed, and the values for turbine temperature. These provisional IGV command positions may be derived from a time map, a shaft speed map, and a turbine temperature map, respectively. In some embodiments, these provisional IGV command positions may be derived from equations stored in controller 80.

Figure 3:
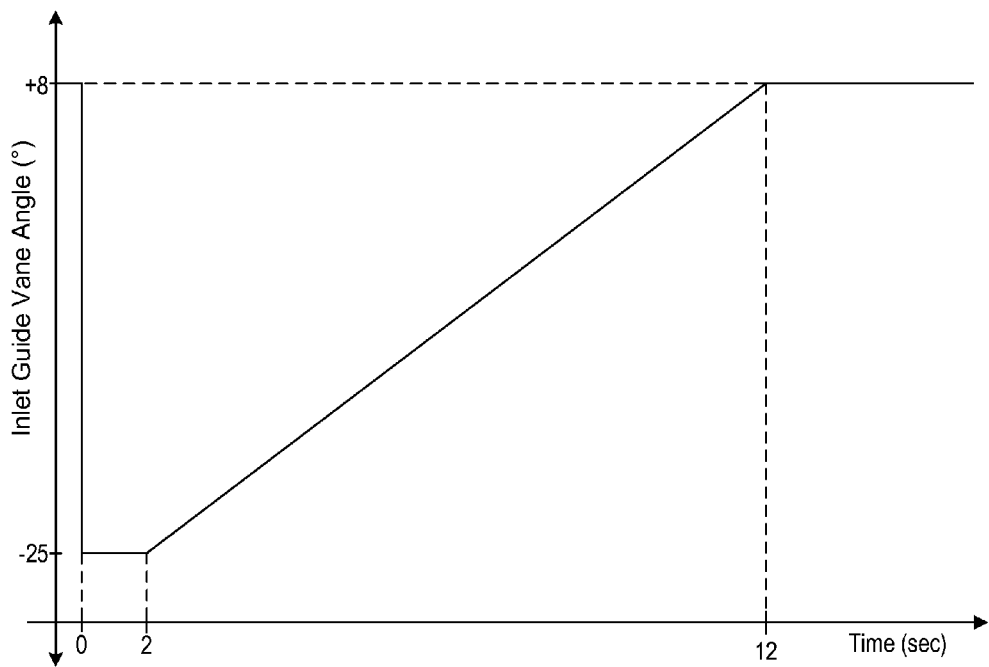
FIG. 3 is an exemplary functional map of provisional inlet guide vane command positions as a function of time elapsed since initiation of an off-load transient.

At step 703, controller 80 may determine the provisional IGV command position corresponding to time elapsed based on the actual amount of time elapsed from the onset of an off-load transient (hereinafter may be referred to as a "time based provisional IGV command position" or a "first provisional IGV command position") and by referencing or correlating stored data indicative of the map in FIG. 3. FIG. 3 depicts an exemplary IGV override time map. According to an exemplary embodiment, the map provides the provisional IGV command position as a function of time. In this embodiment, the time based provisional IGV command position before the onset of an off-load transient (before 0 seconds) is a nominal angle allowing maximum possible air flow into compressor section 200. This nominal angle may be the operating angle of inlet guide vane 255 during normal on-load conditions. In some embodiments, the nominal operating angle may be +8°. At the onset of an off-load transient (0 seconds), the time based provisional IGV command position may be an angle that substantially limits the air flow into compressor section 200. In this embodiment, such an IGV angle is −25°. In some embodiments, the time based provisional IGV command position at this time is an angle that allows the minimum possible air flow into compressor section 200. The time based provisional IGV command position may remain constant for a limited period of time until a first time value. In this embodiment, the first time value is two seconds. In some embodiments, this limited period of time provides sufficient time for the inlet guide vanes to close and limit air flow, and thus prevent possible flame outs of the injectors. After the first time value is reached, the time based provisional IGV command position may increase substantially linearly until a nominal angle that allows maximum possible air flow is reached at a maximum override time. In this embodiment, the maximum override time is 12 seconds and the nominal angle is +8°. In some embodiments, the nominal angle is less than an angle that allows for maximum possible air flow. The specific time values and IGV angle values may be adjusted for different gas turbine engine configurations.

Figure 4:
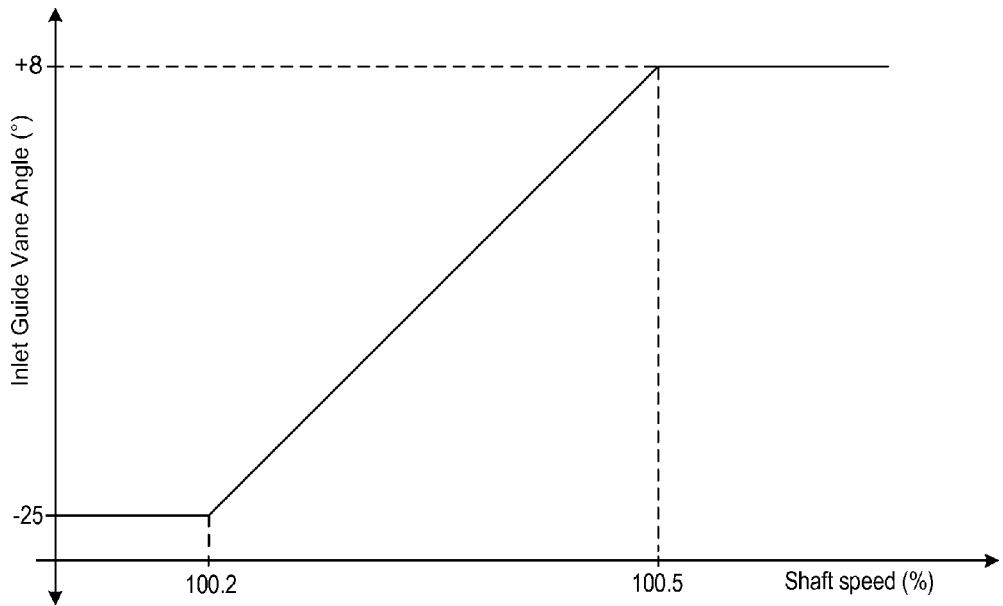
FIG. 4 is an exemplary functional map of provisional inlet guide vane command positions as a function of the speed of a shaft.

Also at step 703, controller 80 may determine the provisional IGV command position corresponding to the shaft speed ($N_{GP}$) based on the determined value for the shaft speed (hereinafter may be referred to as a "speed based provisional IGV command position" or a "second provisional IGV command position") and by referencing or correlating stored data indicative of the map in FIG. 4. $N_{GP}$ may be determined by the reading of shaft speed sensor 43.

According to this embodiment, the map provides the speed based provisional IGV command position as a function of $N_{GP}$. Furthermore, the speed based provisional IGV command position may be an angle that substantially limits the air flow into compressor section 200 when $N_{GP}$ is less than or equal to a first speed greater than a nominal speed. The nominal speed may be the normal operating speed of the shaft. In some embodiments, the nominal speed is represented as a percentage of the operating speed during normal on-load conditions. In some embodiments, the nominal speed is 100%. In this embodiment, the first speed is 100.2% and angle is −25°. Additionally, the speed based provisional IGV command position may be an angle allowing maximum possible air flow into compressor section 200 when $N_{GP}$ is greater than or equal to a second speed greater than nominal speed. In this embodiment, such an angle is +8° and the second speed is 100.5%. In some embodiments, the second speed is less than a maximum allowed speed (sometimes referred to as "overspeed value"). In some embodiments, the overspeed value is 102%. Between the first speed and the second speed, the speed based provisional IGV command position may vary substantially linearly in accordance with $N_{GP}$. The specific speed values may be adjusted for different gas turbine engine configurations.

In embodiments where gas turbine engine 100 is in a single shaft configuration, the speed based provisional IGV command position corresponding to $N_{GP}$ can be omitted.

Figure 5:
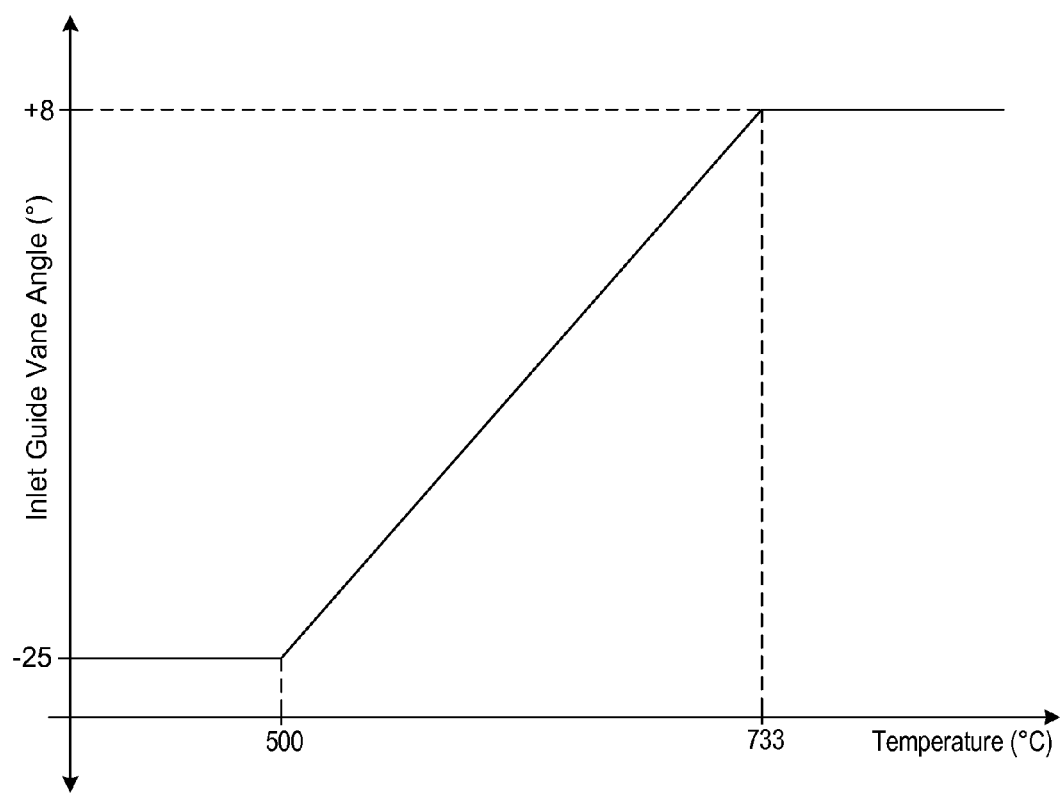
FIG. 5 is an exemplary functional map of provisional inlet guide vane command positions as a function of turbine temperature.

Also at step 703, controller 80 may determine the provisional IGV command position corresponding to the turbine temperature based on the determined value for turbine temperature (hereinafter may be referred to as a "temperature based provisional IGV command position" or a "third provisional IGV command position") and by referencing or correlating stored data indicative of the map in FIG. 5. Turbine temperature may be determined by the reading of turbine temperature sensor 42. According to this embodiment, the map provides the temperature based provisional IGV command position as a function of turbine temperature. Furthermore, the temperature based provisional IGV command position may be an angle that substantially limits the air flow into compressor section 200 when turbine temperature is less than or equal to a first temperature threshold. In this embodiment, such an angle is −25° and the first temperature threshold is 500° C. In some embodiments, the first temperature threshold is 400° C. (not shown) or less. In addition, the temperature based provisional IGV command position may be an angle allowing maximum possible air flow into compressor section 200 when turbine temperature is greater than or equal to a second temperature threshold. In this embodiment, such an angle is +8° and the second temperature threshold is 733° C. In some embodiments, the second temperature threshold is less than a maximum allowed temperature. In some embodiments, the maximum allowed temperature is 760° C. Between the two temperature thresholds, the temperature based provisional IGV command position may vary substantially linearly in accordance with turbine temperature. The specific temperature values may be adjusted for different gas turbine engine configurations.

In a step 704, controller 80 may select one of provisional IGV command positions determined in step 703. In some embodiments, controller 80 may select an IGV command position based on the highest relative value of IGV angle determined in step 703. In some embodiments, however, controller 80 selects the highest relative value of IGV angle determined by the time based provisional IGV command position and the speed based provisional IGV command position during an initial time period regardless of the determined IGV angle value of the temperature based provisional IGV command position. In some embodiments, the initial time period is 300 milliseconds. The initial time period may be a buffer period due to the time it takes for the turbine temperature to change during the onset of an off-load transient. After the initial time period expires, controller 80 may then select the maximum of the three provisional IGV command positions to be the selected IGV command position in step 704.

In some embodiments, the selected IGV command position is modified by a rate limiter. In some embodiments, the rate limiter is 28.5° per second. The rate limiter may minimize the rate of change in IGV angle to prevent structural damage to the inlet guide vanes. The specific rate limiter value may be adjusted for different gas turbine engine configurations.

In a step 705, IGV 255 is adjusted by controller 80 to reflect the selected IGV command position. Specifically, controller 80 may send a signal to IGV 255 directing the adjustment to the selected command position. The actual position of IGV 255 may then conform to the selected IGV command position.

In a step 706, controller 80 determines whether or not the IGV combustion stability process has been completed. The IGV combustion stability process may be completed when the amount of time elapsed reaches or exceeds the maximum override time. As described above, the maximum override time may be 12 seconds. Controller 80 may also determine whether or not the IGV combustion stability process should be aborted. The IGV combustion stability process may be aborted upon the onset of an on-load transient. In some embodiments, an on-load transient may be defined as a substantial increase in power drain of, for example, more than 500 kW between scans of the load driven by gas turbine engine 100, which may occur approximately every 20 milliseconds. If either the maximum override time is exceeded or an on-load transient is detected, the IGV combustion stability process is complete at step 707. If, however, the IGV combustion stability process has not been completed or aborted, it continues at step 702. In other words, the IGV combustion stability process may repeat steps 702-705 until either an on-load transient is detected or the time elapsed since onset of the off-load transient exceeds a maximum override time.

At step 707, the IGV combustion stability process has been completed. Controller 80 will operate the GTE 10 based on normal IGV control protocols. A normal IGV control protocol refers to methods known in the art by which a IGV position is selected by a controller 80 of a gas turbine engine 100. Often, during normal IGV control protocols (e.g. when gas turbine engine 100 is running at full load), the controller 80 selects a maximum air flow inlet position for the IGV 255 and the IGV 255 is adjusted to this position.

The preceding detailed description is merely exemplary in nature and is not intended to limit the invention or the application and uses of the invention. The described embodiments are not limited to use in conjunction with a particular type of gas turbine engine. Furthermore, there is no intention to be bound by any theory presented in the preceding background or detailed description. It is also understood that the illustrations may include exaggerated dimensions to better illustrate the referenced items shown, and are not considered limiting unless expressly stated as such.

The various illustrative logical blocks and steps described in connection with the embodiments disclosed herein may be implemented as electronic hardware, computer software, or combinations of both. To clearly illustrate this interchangeability of hardware and software, various illustrative components, blocks, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods and controller 80 described herein may be implemented in hardware, software, firmware, or any combination thereof. Any features described as components or blocks may be implemented together in an integrated logic device or separately as discrete but interconnected logic devices. If implemented in software, the methods may be realized at least in part by a computer-readable non-volatile data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the methods described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein.

Those of skill will appreciate that the various illustrative blocks described in connection with the embodiment disclosed herein can be implemented in various forms. Some blocks have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a block or step is for ease of description. Specific functions or steps can be moved from one block or distributed across to blocks without departing from the disclosure.

The above description of the disclosed embodiment is provided to enable any person skilled in the art to make or use the subject matter of the disclosure. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the disclosure and are therefore representative of the subject matter which is broadly contemplated by the present disclosure. It is further understood that the scope of the present disclosure fully encompasses other embodiment that may become obvious to those skilled in the art and that the scope of the present disclosure is accordingly limited by nothing other than the appended claims.

What is claimed is:

1. A method for controlling a position of an inlet guide vane of a gas turbine engine, comprising:
    a) determining an onset of an off-load transient;
    b) determining a value representative of an amount of time elapsed since the onset of the off-load transient, and a value representative of a turbine temperature;
    c) determining a time based provisional inlet guide vane command position based on the time elapsed since the onset of the off-load transient, and a temperature based provisional inlet guide vane command position based on the value representative of the turbine temperature;
    d) determining which of the time based and temperature based provisional inlet guide vane command positions is associated with a highest relative value of an inlet guide vane angle and selecting the provisional inlet guide vane command position associated with the highest relative value of the inlet guide vane angle; and
    e) adjusting the position of the inlet guide vane to match the selected inlet guide vane command position.

2. The method of claim 1, further comprising
    determining a value representative of a shaft speed;
    determining a speed based provisional inlet guide vane command position based on the value representative of the shaft speed;
    determining which of the time based, temperature based, and speed based provisional inlet guide vane command positions is associated with a highest relative value of the inlet guide vane angle and selecting the provisional inlet guide vane command position associated with the highest relative value of the inlet guide vane angle; and
    adjusting the position of the inlet guide vane to match the selected inlet guide vane command position.

3. The method of claim 2, wherein during an initial time period, the selected provisional inlet guide vane command position associated with the highest relative value is selected from the time based provisional inlet guide vane command position and the speed based provisional inlet guide vane command position.

4. The method of claim 1, wherein the steps b) through e) are performed repeatedly until either an on-load transient is detected or the time elapsed since the onset of the off-load transient exceeds a maximum override time.

5. The method of claim 1, wherein determining an onset of the off-load transient includes monitoring a load driven by the gas turbine engine, and determining that a power drain of the load has dropped more than a threshold amount within a specific time frame.

6. The method of claim 1, wherein determining the time based provisional inlet guide vane command position based on the time elapsed since the onset of the off-load transient further includes correlating the time elapsed with stored data that indicates provisional command positions as a function of time elapsed since onset of the off-load transient.

7. The method of claim 6, wherein when no time has elapsed since onset of the off-load transient, the time based provisional inlet guide vane command position is an angle limiting the air flow into a compressor section of the gas turbine engine;

when the time elapsed is between 0 seconds and a first time value, the time based provisional inlet guide vane command position remains constant from 0 seconds to the first time value; and when the time elapsed is between the first time value and a maximum override time, the time based provisional inlet guide vane command position varies linearly from the first time value to the maximum override time value, in which at the maximum override time value, the time based provisional inlet guide vane command position is an angle allowing maximum possible air flow into the compressor section.

8. The method of claim 1, wherein determining the temperature based provisional inlet guide vane command position based on the value representative of the turbine temperature further includes correlating the value representative of the turbine temperature with stored data that indicates provisional command positions as a function of respective turbine temperatures.

9. The method of claim 8, wherein when the value representative of a turbine temperature is less than a first temperature value, the temperature based provisional inlet guide vane command position is an angle limiting the air flow into a compressor section of the gas turbine engine;

when the value representative of a turbine temperature is greater than a second temperature value, the temperature based provisional inlet guide vane command position is an angle allowing maximum possible air flow into the compressor section; and when the value representative of a turbine temperature is between the first and second temperature values, the temperature based provisional inlet guide vane command position varies linearly from the first temperature value to the second temperature value.

10. The method of claim 2, wherein determining the speed based provisional inlet guide vane command position based on the value representative of the shaft speed further includes correlating the value representative of the shaft speed with stored data that indicates provisional command positions as a function of respective shaft speeds.

11. The method of claim 10, wherein when the value representative of a shaft speed is less than a first shaft speed, the speed based provisional inlet guide vane command position is an angle limiting the air flow into a compressor section of the gas turbine engine;

when the value representative of a shaft speed is greater than a second shaft speed, the speed based provisional inlet guide vane command position is an angle allowing maximum possible air flow into the compressor section; and when the value representative of a shaft speed is between the first and second shaft speeds, the speed based provisional inlet guide vane command position varies linearly from the first shaft speed to the second shaft speed.

12. The method of claim 1, wherein the step of d) further includes modifying the value of the selected inlet guide vane command position with a rate limiter.

13. A method for operating a gas turbine engine, comprising:

detecting an off-load transient of the gas turbine engine;

reducing a total flow of fuel to a combustor section of the gas turbine engine to a first reduced flow in response to detecting the off-load transient;

increasing a ratio of pilot fuel to total fuel in the first reduced flow of fuel in response to detecting the off-load transient;

adjusting a position of an inlet guide vane in response to detecting the off-load transient until either an on-load transient is detected or until an amount of time elapsed since detection of the off-load transient exceeds a maximum override time;

determining a value representative of at least two of the following: an amount of time elapsed since the onset of the off-load transient, a value representative of a turbine temperature, and a value representative of a shaft speed;

determining at least two of a time based provisional inlet guide vane command position based on the time elapsed since the onset of the off-load transient, a temperature based provisional inlet guide vane command position value based on the value representative of the turbine temperature, and a speed based provisional inlet guide vane command position based on the value representative of the shaft speed;

determining which of the time based, temperature based, or speed based provisional inlet guide vane command positions is associated with a highest relative value of an inlet guide vane angle and selecting the provisional inlet guide vane command position associated with the highest relative value of the inlet guide vane angle; and adjusting the position of the inlet guide vane to match the selected inlet guide vane command position.

14. The method of claim 13, wherein determining the time based provisional inlet guide vane command position further includes correlating the time elapsed with stored data that indicates provisional command positions as a function of time elapsed since onset of the off-load transient; and determining the temperature based provisional inlet guide vane command further includes correlating the value representative of the turbine temperature with stored data indicative of provisional command positions as a function of respective turbine temperatures; and determining the speed based provisional inlet guide vane command further includes correlating the value representative of the shaft speed with stored data that indicates provisional command positions as a function of respective shaft speeds.

15. The method of claim 14, wherein when no time has elapsed since onset of the off-load transient, the time based provisional inlet guide vane command position is an angle limiting the air flow into a compressor section of the gas turbine engine;

when the time elapsed is between 0 seconds and a first time value, the time based provisional inlet guide vane command position remains constant from 0 seconds to the first time value; and when the time elapsed is between the first time value and a maximum override time value, the time based provisional inlet guide vane command position varies linearly from the first time value to the maximum override time value, in which at the maximum override time value, the time based provisional inlet guide vane command position is an angle allowing maximum possible air flow into the compressor section.

16. The method of claim 14, wherein when the value representative of a turbine temperature is less than a first temperature value, the temperature based provisional inlet guide vane command position is an angle limiting the air flow into a compressor section of the gas turbine engine;

when the value representative of a turbine temperature is greater than a second temperature value, the temperature based provisional inlet guide vane command position is an angle allowing maximum possible air flow into the compressor section; and when the value representative of a turbine temperature is between the first and second temperature values, the temperature based provisional inlet guide vane command position varies linearly from the first temperature value to the second temperature value.

17. The method of claim 14, wherein when the value representative of a shaft speed is less than a first shaft speed, the speed based provisional inlet guide vane command position is an angle limiting the air flow into a compressor section of the gas turbine engine;

when the value representative of a shaft speed is greater than a second shaft speed, the speed based provisional inlet guide vane command position is an angle allowing maximum possible air flow into the compressor section; and when the value representative of a shaft speed is between the first and second shaft speeds, the speed based provisional inlet guide vane command position varies linearly from the first shaft speed to the second shaft speed.

18. A method for operating a gas turbine engine, comprising:

detecting an off-load transient of the gas turbine engine;

reducing a total flow of fuel to a combustor section of the gas turbine engine to a first reduced flow in response to detecting the off-load transient;

increasing a ratio of pilot fuel to total fuel in the first reduced flow of fuel in response to detecting the off-load transient;

adjusting a position of an inlet guide vane in response to detecting the off-load transient until either an on-load transient is detected or until an amount of time elapsed since detection of the off-load transient exceeds a maximum override time;

determining a value representative of an amount of time elapsed since the onset of the off-load transient, and a value representative of a turbine temperature;

determining a time based provisional inlet guide vane command position based on the time elapsed since the onset of the off-load transient, and a temperature based provisional inlet guide vane command position value based on the value representative of the turbine temperature;

determining which of the time based and temperature based provisional inlet guide vane command positions is associated with a highest relative value of an inlet guide vane angle and selecting the provisional inlet guide vane command position associated with the highest relative value of the inlet guide vane angle; and adjusting the position of the inlet guide vane to match the selected inlet guide vane command position.

* * * * *